(12) United States Patent
Sjong et al.

(10) Patent No.: US 8,524,919 B2
(45) Date of Patent: Sep. 3, 2013

(54) ACTIVE POLYMERIC FILTERS

(75) Inventors: Angele Sjong, Louisville, CO (US); Kraig Anderson, Burlingame, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/445,567

(22) Filed: Apr. 12, 2012

(65) Prior Publication Data

US 2013/0096262 A1 Apr. 18, 2013

(30) Foreign Application Priority Data

Oct. 18, 2011 (WO) ................ PCT/US2011/056683

(51) Int. Cl.
*C07D 321/00* (2006.01)

(52) U.S. Cl.
USPC .......................................................... 549/200

(58) Field of Classification Search
USPC .......................................................... 549/200
See application file for complete search history.

(56) References Cited

U.S. PATENT DOCUMENTS

| 5,000,899 A | 3/1991 | Dreibelbis et al. |
| 6,533,975 B1 | 3/2003 | Kosinski et al. |

FOREIGN PATENT DOCUMENTS

EP 0 697 238 2/1996

OTHER PUBLICATIONS

Shiney et al., Polystyrene-bound dioxirane: a New class of recyclable oxidising reagent, polymer international 41 (1996) 377-381.*
Boehlow, T.R. et al., "Applications of Free and Resin-bound Novel (Trifluoromethyl)dioxiranes," Tetrahedron Letters, 1998, vol. 39, pp. 1839-1842.
International Search Report and Written Opinion for PCT/US2011/056683 mailed Jan. 30, 2012.
Kan, J.T.W. et al., "Poly(ethylene glycol)-supported 3B1,3B1,3B1-trifluoroacetophenone in dioxirane mediated alkene epoxidation reactions," Tetrahedron Letters, 2004, vol. 45, pp. 6357-6359.
Shiney, A. et al., "Polystyrene-Bound Dioxirane: a New Class of Recyclable Oxidising Reagent," Polymer International, 1996, vol. 41, pp. 377-381.
Cope, et al., "trans-Cyclooctene," Org. Synth. Coll., 1973, vol. 5, p. 315; 1969, vol. 49, p. 39, 5 pages.
Curci, R. et al., "Dioxirane oxidations—Taming the reactivity-selectivity principle," Pure and Applied Chemistry, 1995, vol. 67, No. 5, pp. 811-822.
Gilmer, T.C. et al., "Synthesis, characterization, and mechanical properties of PMMA/poly(aromatic/aliphatic siloxane) semi-inter-penetrating polymer networks," J. Polym. Sci. Pol. Chem., 1996, vol. 34, pp. 1025-1037.
Heiss, H.L. et al., "Preparation of Polymers from Diisocyanates and Polyols," Ind. Eng. Chem., 1954, vol. 46, No. 7, pp. 1498-1503.
Isaure, F. et al., "Facile synthesis of branched water-soluble poly(dimethylacrylamide)s in conventional and parallel reactors using free radical polymerisation," Reactive and Functional Polymers, 2006, vol. 66, pp. 65-79.
Monieau, C. et al., "Synthesis and characterization of poly(methyl methacrylate)-block-poly(n-butyl acrylate)-block-poly(methyl methacrylate) copolymers by two-step controlled radical polymerization (ATRP) catalyzed by NiBr2(PPh3)2, 1 ," Macrolmolecules, 1999, Published on Web Nov. 24, 1999, vol. 32, No. 25, pp. 8277-8282.
Nenajdenko, V.G. et al., "Perfluoroacylation of Alkenes," Tetrahedron, 1994, vol. 50, No. 37, pp. 11023-11038.
Ochiai, B. et al., "Dispersion Polymerization Accompanied by $CO_2$ Fixation: Synthesis of Particles of Polymers Bearing Cyclic Carbonate and Epoxide Moieties," Journal of Polymer Science: Part A: Polymer Chemistry, 2010, vol. 48, pp. 5382-5390.
Russo, A. et al., "Difluorodioxirane," Angewandte Chemie international Edition in English, 1993, vol. 32, No. 6, pp. 905-907.
Shepherd, A., "Activated Carbon Adsorption for Treatment of Voc Emissions," Presented at the 13th Annual EnviroExpo, Boston, MA, May 2001, 4 pages.
Shi, Y., "Organocatalytic asymmetric epoxidation of olefins by chiral ketones," Acc. Chem. Res., 2004, Published on Web Jul. 13, 2004, vol. 37, No. 8, pp. 488-496.
Sung, K., "Substituent effects on stability of oxiranes, oxirenes, and dioxiranes," Can. J. Chem., 2000, vol. 78, 562-567.
Weissberger, A. et al., "Methyl Pyruvate," Org. Synth., 1955, vol. 3, p. 610, 1944, vol. 24, p. 72, 4 pages.
Wong, M-K. et al., "Dioxiranes Generated in Situ from Pyruvates and Oxone as Environmentally Friendly Oxidizing Agents for Disinfection," Environ. Sci. Technol., 2006, vol. 40, pp. 625-630.
Yang, D., "Ketone-catalyzed asymmetric epoxidation reactions," Acc. Chem. Res., 2004, Published on Web Apr. 22, 2004, vol. 37, No. 8, pp. 497-505.
Yu, W.H. et al., "Controlled Grafting of Well-Defined Epoxide Polymers on Hydrogen-Terminated Silicon Substrates by Surface-Initiated ATRP at Ambient Temperature," Langmuir, 2004, Published on Web Jul. 27, 2004, vol. 20, No. 19, pp. 8294-8300.
Zhang, J. et al., "Preparation of a Poly(methyl methacrylate)/Ultrahigh Molecular Weight Polyethylene Blend Using Supercritical Carbon Dioxide and the Identification of a Three-Phase Structure: An Atomic Force Microscopy Study," Macromolecules, 2002, Published on Web Oct. 5, 2002, vol. 35, No. 23, pp. 8869-8877.
Non-final Office Action received for U.S. Appl. No. 13/614,279 dated Nov. 28, 2012.
Vollhardt, K.P.C., et al., "Activation or Deactivation by Substituents on a Benzene Ring," Organic Chemistry: Structure and Function, 1999, 3rd Ed., Ch. 16-1, pp. 690-691, W.H. Freeman and Company, New York, New York, NY.
Notice of Allowance for U.S. Appl. No. 13/614,279, mailed on May 22, 2013, 10 pages.

\* cited by examiner

*Primary Examiner* — Ling Choi
*Assistant Examiner* — Monique Peets
(74) *Attorney, Agent, or Firm* — Foley & Lardner LLP

(57) ABSTRACT

A compound includes a polymer where the polymer includes a pendant dioxirane moiety. Cost-effective, facilitated generation of a polymer including a pendant dioxirane moiety allows for the compound to be disposable or be easily recycled. The compound can be used in air purification and liquid purification to not only remove particulate matter, but also to destroy microorganisms and remove volatile organic compounds.

13 Claims, No Drawings

ACTIVE POLYMERIC FILTERS

This application claims the benefit of International Application Serial No. PCT/US2011/056683, filed on Oct. 18, 2011, the entire disclosure of which is hereby incorporated by reference for all purposes in its entirety as if fully set forth herein.

FIELD

The present technology relates to compounds for active chemical filters for gas and liquid purification.

BACKGROUND

The following description is provided to assist the understanding of the reader. None of the information provided or references cited is admitted to be prior art to the present technology.

Demand is increasing worldwide for reliable, efficient, and low-cost air treatment systems in confined spaces. Air contaminants include volatile organic compounds (VOCs), inorganic/organic particulates, and biological particulates such as bacteria, fungi (mold), and various other biological contaminants (including viruses). Many filtration strategies exist for purifying air, yet they suffer from various drawbacks.

Physical filtration strategies remove most particulates, but have little effect on VOCs. They can also serve as a breeding ground for microorganisms, which compromise the flow rate of air through the filter.

Electrostatic filtration strategies improve on basic physical filtration without further restricting airflow. However, energy is required to charge the filter. Importantly, electrostatic filtration strategies do not address VOCs and they do not kill bacteria. They can therefore serve as a breeding ground for microorganisms.

Photochemical filters generally include $TiO_2$ as an agent to generate singlet oxygen, which can kill microorganisms. While generally effective, and despite the $TiO_2$ having a long lifetime, the lifetime of the active species of the filter, e.g. the singlet oxygen, is very short. In addition, favorable $TiO_2$ kinetics are limited to a small number of surfaces.

Active Chemical filtration is effective, but the lifetime may be too short. In addition, the filter may be expensive and/or burdensome to replace or recharge. Other problems are that the active chemical can be a health hazard (e.g. ozone), and/or very slow kinetics (e.g. peroxymonosulfate).

SUMMARY

The present technology provides for a polymer having a pendant dioxirane moiety that is reactive toward microorganisms and VOCs, and is capable of oxidizing those materials to either kill them or render them harmless. This is achieved by configuring the polymer into a filter through which a contaminated fluid, i.e. gas or liquid, may be passed. As the fluid passes through the filter, at least a portion of the contaminant may be oxidized by the pendant dioxirane moiety, thus purifying the fluid and reducing or eliminating the amount of contaminant present in the fluid.

In one aspect, a polymer includes a pendant dioxirane moiety. In various embodiments, the pendant dioxirane moiety is generally represented by Formula I or Formula II:

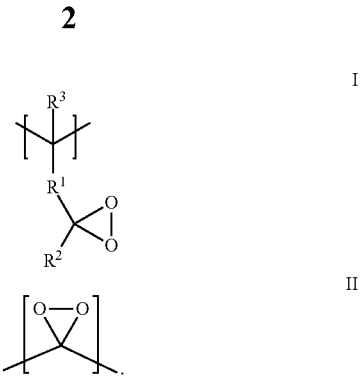

In Formula I, the pendant dioxirane may be part of a side chain extending off the backbone of the polymer. In Formula II, the pendant dioxirane may be part of the backbone of the polymer. In the above Formula I, $R^1$ may be a bond (i.e. absent), alkylene, perhaloalkylene, cycloalkylene, arylene, heteroarylene, heterocyclylene, amino, carbonyl, carboxyl, alkylcarboxy, carboxyalkyl or alkylcarboxyalkyl; $R^2$ may be an electron withdrawing group; and $R^3$ may be a hydrogen, alkyl, perhaloalkyl, cycloalkyl, aryl, heteroaryl, heterocyclyl, amino, carbonyl, carboxyl, alkylcarboxy, carboxyalkyl or alkylcarboxyalkyl.

In another aspect, a process is provided including providing a first polymer including an oxo group and reacting the oxo group with peroxymonosulfate to form a second polymer including a pendant dioxirane moiety.

In another aspect, an article is provided including a polymer which includes a pendant dioxirane moiety. In various embodiments, this article is a gas or liquid filter.

In a further aspect, a method of gas purification is provided including passing gas through a filter including a polymer including a pendant dioxirane moiety and the gas includes a biological contaminant or chemical contaminant. In some embodiments, the gas is air.

In another aspect, a method of fluid purification is provided including passing a fluid, such a liquid or gas, through a filter, where the filter includes a polymer including a pendant dioxirane moiety and the fluid includes a biological contaminant or chemical contaminant.

In another aspect, a method is provided including providing a filter including a polymer, the polymer including ketone moieties, and converting the ketone moieties to dioxirane moieties by reacting the polymer with peroxymonosulfate.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain, branched chain, or cyclic alkyl groups having 1 to 24 carbons or the number of carbons indicated herein. In some embodiments, an alkyl group has from 1 to 16 carbon atoms, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the alkyl groups may be substituted alkyl groups.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, among others. Representative substituted alkenyl groups may be mono-substituted or substituted more than once, such as, but not limited to, mono-, di- or tri-substituted with substituents such as those listed above.

The terms "alkylene," "cycloalkylene," and "alkenylene," alone or as part of another substituent means a divalent radical derived from an alkyl, cycloalkyl, or alkenyl group, respectively, as exemplified by —CH$_2$CH$_2$CH$_2$CH$_2$—. For alkylene, cycloalkylene, and alkenylene linking groups, no orientation of the linking group is implied.

The term "amine" (or "amino") as used herein refers to —NHR and —NRR' groups, where R, and R' are independently hydrogen, or a substituted or unsubstituted alkyl, alkenyl, alkynyl, cycloalkyl, aryl or aralkyl group as defined herein. Examples of amino groups include —NH$_2$, methylamino, dimethylamino, ethylamino, diethylamino, propylamino, isopropylamino, phenylamino, benzylamino, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

The present technology provides for a polymer having a pendant dioxirane moiety that is reactive toward microorganisms and VOCs, and is capable of oxidizing those materials to either kill them or render them harmless. In some embodiments, this is achieved by configuring the polymer into a filter through which a contaminated fluid, i.e. gas or liquid, may be passed. The contaminated fluid may include a contaminant such as a microorganism or VOC. As the fluid passes through the filter, at least a portion of the contaminant may be oxidized by the pendant dioxirane moiety, thus purifying the fluid and reducing or eliminating the amount of contaminant present in the fluid.

In one aspect, a polymer is provided including a pendant dioxirane moiety. Dioxiranes are cyclic peroxides which may be prepared by the oxidation of carbonyl groups, using various peroxy carbonyl species. The pendant dioxirane may include a member of the cyclic group that is within the polymer backbone (i.e. by oxidation of a carbonyl group, where the carbon atom is located in the polymer chain), or the pendant dioxirane may be part of an organic group, or side chain of the polymer backbone.

In one embodiment, the polymer includes a unit represented by Formula I or II:

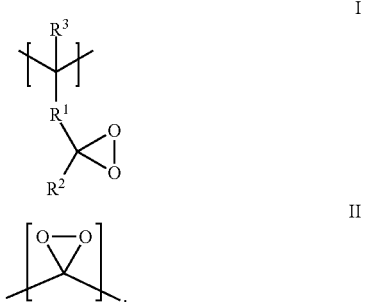

In Formula I, the pendant dioxirane is part of a side chain extending off the backbone of the polymer. In Formula II, the pendant dioxirane is part of the backbone of the polymer. In Formulas I, $R^1$ is a bond (i.e. $R^1$ is absent), or $R^1$ is alkylene, perhaloalkylene, cycloalkylene, arylene, heteroarylene, heterocyclylene, amino, carbonyl, carboxyl, alkylcarboxy, carboxyalkyl or alkylcarboxyalkyl; $R^2$ includes an electron withdrawing group; and $R^3$ is H, alkyl, perhaloalkyl, cycloalkyl, aryl, heteroaryl, heterocyclyl, amino, carbonyl, carboxyl, alkylcarboxy, carboxyalkyl or alkylcarboxyalkyl.

In Formula I, the electron withdrawing group is a $-N^+R^4R^5R^6$ group, a halogen, $NO_2$, C(O)H, a $CO_2R^7$ group, an alkoxy group, or a perhaloalkyl group, where $R^4$, $R^5$, $R^6$, and $R^7$ are each independently H, alkyl, or cycloalkyl. According to some embodiments, the electron withdrawing group is a perfluoroalkyl.

In various embodiments, $R^1$ is an alkylene, perhaloalkylene, carbonyl, carboxyl, alkylcarboxyl, carboxyalkyl, or alkylcarboxyalkyl.

The polymer backbone may generally be any polymer which includes a carbonyl group, to which a moiety containing a carbonyl group may be attached. For example, the polymer backbone may be a polyolefin, a polyalkylene terephthalate, a polyacrylate, a polylactate, a polycarbonate, a polyester, a polysaccharide, a polyacetate, a polystyrene maleic anhydride, a polyurethane, a polyamide, a polyacrylamide, a polymethacrylate, a poly(methyl)methacrylate, an aramid, or a co-polymer of any two or more such polymers.

In other embodiments, the polymer includes a unit represented by Formula III or IV:

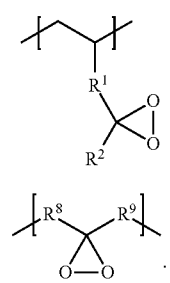

In Formulas III and IV, $R^1$ is absent (i.e. a bond between the polymer backbone and the methylene group of the dioxirane), or $R^1$ is alkylene, perhaloalkylene, cycloalkylene, arylene, heteroarylene, heterocyclylene, amino, carbonyl, carboxyl, alkylcarboxy, carboxyalkyl or alkylcarboxyalkyl; $R^2$ is an electron withdrawing group; $R^8$ is $-N^+R^4R^5$ or alkyl; $R^9$ is $-N^+R^4R^5$ or alkyl; each $R^4$ is independently H, alkyl, or cycloalkyl; each $R^5$ is independently H, alkyl, or cycloalkyl; $R^6$ is H, alkyl, or cycloalkyl; and $R^7$ is H, alkyl, or cycloalkyl. Suitable election withdrawing groups include, but are not limited to, $-N^+R^4R^5R^6$ groups, a halogen, $NO_2$, C(O)H, a $CO_2R^7$ group, an alkoxy group, or a perhaloalkyl group, where $R^4$, $R^5$, $R^6$, and $R^7$ are each independently H, alkyl, or cycloalkyl. According to some embodiments, the electron withdrawing group of Formula III is a perfluoroalkyl. According to some embodiments, $R^1$ is an alkylene, perhaloalkylene, carbonyl, carboxyl, alkylcarboxyl, carboxyalkyl, or alkylcarboxyalkyl. In some embodiments of Formula III, $R^1$ is absent, or $R^1$ is a $C_1$-$C_6$ alkylene or $-N^+R^4R^5$; and $R^2$ is alkylene, perhaloalkylene, $CO_2R^7$ or $-N^+R^4R^5R^6$. In some embodiments, of Formula IV, $R^8$ is $-N^+R^4R^5$ or alkyl; and $R^9$ is $-N^+R^4R^5$ or alkyl. In some embodiments, the polymer includes a repeat unit represented by Formula III where $R^1$ is absent, methylene or ethylene; and $R^2$ is H, methyl, ethyl, or trimethylammonium. In some embodiments, the polymer includes a repeat unit represented by Formula IV where $R^8$ is $C_1$-$C_8$ alkylene; $R^9$ is $-N^+R^4R^5$, $R^4$ is alkyl; and $R^5$ is alkyl. In some embodiments, $R^8$ is $-N^+R^4R^5$; $R^9$ is $-N^+R^4R^5$; $R^4$ is alkyl; and $R^5$ is alkyl.

The dioxirane moiety of the polymer is a highly reactive group, yet it has a sufficiently long lifetime to make practical use of the dioxirane. As noted, above, the polymers with the pendant dioxiranes may be generated from polymers having at least one carbonyl (CO) group. This broad spectrum of options allows the properties of the polymer to be modified for a wide range of applications.

For example, to increase compatibility with different solutions, the polymer may be selected to be either more hydrophilic or more hydrophobic. If the polymer is to be used to purify aqueous solutions, it may be desirable to have a more hydrophilic polymer, containing groups such as carboxyl groups, hydroxyl groups, ethers, amines, or ammonium groups. If the polymer is to be used to purify a contaminated oil, the polymer may include more alkyl or aryl groups to increase the hydrophobicity of the polymer. Furthermore, the ability to use different polymers together allows for a very broad scope of intended application environments, and for a wide range of contaminants to be oxidized.

In another aspect, a process is provided preparing a polymer having a pendant dioxirane moiety. For example, the process may include providing a first polymer including an carbonyl group and contacting the carbonyl group with a peroxymonosulfate to form a second polymer that includes the pendant dioxirane moiety. The process may include combining the first polymer with a solution that includes the peroxymonosulfate. In various embodiments, the pendant dioxirane moiety, i.e. the second polymer, is represented by any of Formulas I, II, III, or IV as described above.

In various embodiments, the first polymer includes a polyalkylene terephthalate, a polyacrylate, a polylactate, a polycarbonate, a polyester, a polysaccharide, a polyacetate, a polystyrene maleic anhydride, a polyurethane, a polyamide, a polyurea, a polyacrylamide, a polymethacrylate, a poly(methyl)methacrylate, an aramid, or a co-polymer of any two or more such polymers. In some embodiments, the first polymer includes a poly(alkyl-2-ketoalkenoate). In certain embodiments, the poly(alkyl-2-ketoalkenoate) is poly(methyl-2-keto-3-butenoate) or poly(methyl-2-keto-4-pentenoate).

Suitable peroxymonosulfates include, but are not limited to, those such as alkali metal peoroxymonosulfates, ammonium peroxymonosulfates, and phosphonium peroxymonosulfates. Illustrative peroxymonosulfates include, but are not limited to, lithium peroxymonosulfate, sodium peroxymonosulfate, potassium peroxymonosulfate, tetramethylammonium peroxymonosulfate, tetraethylammonium peroxymonosulfate, trimethylammonium peroxymonosulfate, triethylammonium peroxymonosulfate, triisopropylammonium peroxymonosulfate, tetraisopropylammonium peroxymonosulfate, and benzyltriphenylphosphonium peroxymonosulfate.

Peroxymonosulfate oxidants are available commercially, for example, potassium peroxymonosulfate sold under the name OXONE® (DuPont, Wilmington Del.). Other forms of peroxymonosulfate are available with different counterions, such as alkali metal cations, alkali earth metal cations, ammonium cations, tetraalkylammonium cations, and the like. For example, a form of peroxymonosulfate having a tetrabutylammonium cation is commercially available under the name OXONE® tetrabutylammonium salt (Sigma-Aldrich, St. Louis, Mo.).

The peroxymonosulfate solution may be prepared from water and a peroxymonosulfate compound at a concentration from about 0.1 millimolar to about 1 molar, or in some examples from about 1 millimolar to about 100 millimolar. In some examples, a peroxymonosulfate solution may include a base or buffer to adjust the pH. The solution may have a pH between about 4 and about 10, or in some examples, the pH may be about 7. Suitable bases for adjusting the pH of the peroxymonosulfate solution include carbonates and bicarbonates of alkali metals and alkali earth metals, e.g., sodium bicarbonate, potassium carbonate, and the like. In some examples, a peroxymonosulfate solution may include other components which may function as processing aides, wetting aids, or the like. For example, the peroxymonosulfate solution may include organic solvents, surfactants, and/or phase transfer reagents. Suitable organic solvents include water miscible organic solvents, for example acetonitrile, alcohols, or the like. Suitable surfactants include anionic, cationic, and nonionic surfactants. Suitable phase transfer reagents include, for example, organic quaternary ammonium salts, e.g., tetrabutylammonium bromide. In some examples, the surfactant may also function as a phase transfer reagent, for example, the quaternary ammonium surfactant cetyl trimethylammonium bromide. In some examples, the peroxymonosulfate may be provided as a quaternary ammonium salt, for example, the OXONE® tetrabutylammonium salt.

In one illustrative example, the process includes contacting a first polymer having a carbonyl group with a mixture of water and $KHSO_5$ (potassium peroxymonosulfate). After completion, the polymer with a pendant dioxirane is recovered and isolated.

In another aspect, an article is provided including a polymer which includes a pendant dioxirane moiety. Such polymers may be as described above with regard to Formulas I, II, III and IV. In some embodiments, the article is a fibrous woven substrate such as a filter. Such filters may be prepared by forming the polymer into fibers which are then fabricated into filters, or the polymers may be blown into a foam which then fabricated into a filter. The polymers may be formed into the filter either before or after the pendant dioxirane moiety has been formed on the polymer. For example, the first polymer, including carbonyl groups, is formed into the filter. The filter is then contacted with the peroxymonosulfate to form a pendant dioxirane moiety on the polymer. Alternatively, the polymer with a pendant dioxirane moiety is formed into a filter. In various embodiments, the article is a fluid filter. For example, the fluid filter may be a gas filter or a liquid filter. Gas filters include, but are not limited to, air filters. The filters may be constructed in the same way home air filters and HEPA filters are constructed.

For example, a non-woven, fibrous substrate, such a filter, may be manufactured with intermingled fibers to create an air-pervious substrate. Mats of randomly overlaid fibers may be produced by commercially available non-woven manufacturing apparatus according to methods described by the manufacturer thereof. For example, a suitable apparatus may be the RANDO-WEBBER® (Curlator Corporation, Rochester, N.Y.).

Once formed the fibrous substrate having a polymer fiber including pendant carbonyl groups may be contacted with a mixture of water and peroxymonosulfate, as described above. A non-woven, air pervious fibrous substrate may be formed in a conventional manner using a non-woven manufacturing apparatus. The substrate may be contacted to a peroxymonosulfate solution, e.g., by spraying, dipping, or the like to result in dioxirane groups formed at the polymer from the pendant carbonyl groups. The spent peroxymonosulfate solution may be collected for reclamation and recycling.

Fibrous substrates manufactured by such machines may include binders, adhesives, stiffeners and flame retardants, which may be applied after treatment with the peroxymonosulfate solution. The filtration characteristics of the fibrous substrate may be determined by the fiber size, thickness of the fibrous substrate and type of binders used in fabrication.

In a further aspect, a method of gas purification is provided including passing a gas through a filter, where the filter includes a polymer including a pendant dioxirane moiety and the gas includes a biological contaminant or chemical contaminant. In another aspect, a method of liquid purification is provided including passing a liquid through a filter, where the filter includes a polymer including a pendant dioxirane moiety and the liquid includes a biological contaminant or chemical contaminant.

In some embodiments, the method of gas purification further includes passing a gas through the filter, where the gas contains a biological or chemical contaminant. As the gas passes through the filter, the dioxirane moiety oxidizes the contaminant, resulting in reduction of the dioxirane moiety to a carbonyl, or ketone group. The filter may act to trap the oxidized contaminant, or allow the oxidized and deactivated contaminant to pass through, with the filter merely providing increased surface area for reaction of the polymer with the contaminant. The method may further include, after reaction with the contaminant, regenerating the dioxirane by reacting the ketone groups with an effective amount of a peroxymonosulfate.

In another aspect, a method is provided including providing a filter including a polymer, the polymer including ketone moieties, and converting the ketone moieties to dioxirane moieties by reacting the polymer with peroxymonosulfate.

The present technology, thus generally described, will be understood more readily by reference to the following Examples, which are provided by way of illustration and are not intended to be limiting of the present technology.

EXAMPLES

General Procedure A: A mixture of water (1 L), sodium bicarbonate (2 M), and $2KHSO_5 \cdot KHSO_4 \cdot K_2SO_4$ (2 M with respect to $KHSO_5$) is continuously flowed through the polymer (100 g) via mechanical stirrer for 1 h. The solution is removed by filtration with a Buchner funnel, then washed with two 50 mL portions water, followed by aspiration to remove most of the water. The resulting polymer is then further dried by freeze-drying.

Example 1

Preparation of a representative polyalkylene terephthalate including a pendant dioxirane moiety. The polyalkylene terephthalate can either be prepared according to known methods from 1,4-butanediol and terephthaloyl chloride or obtained commercially, such as from BASF (sold as ULTRADUR). At least one of the carbonyl groups of the polyalkylene terephthalate is oxidized according General Procedure A. Such a process is illustrated in Scheme 1 where both carbonyl groups are converted to dioxirantes, however it is to be understood that only one of the groups may be converted, and not every monomer unit in the polymer is necessarily converted.

Scheme 1

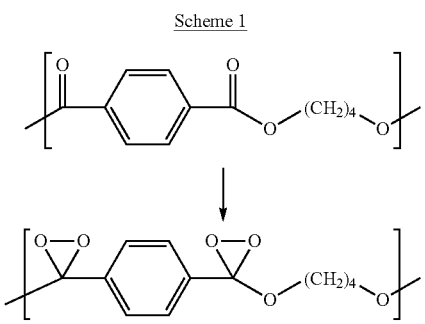

Example 2

Preparation of a representative poly(methyl)acrylate including a pendant dioxirane moiety, according to Scheme 2. Poly(methyl)acrylate can be prepared by known methods from methyl acrylate or obtained commercially. The poly(methyl)acrylate is oxidized according to General Procedure A. It should be noted that not every monomeric unit of the polymer may include a dioxirane moiety.

Scheme 2

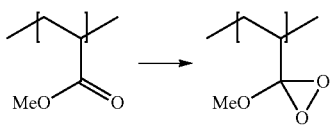

Example 3

Preparation of a polylactate including a pendant dioxirane moiety, according to Scheme 3. Polylactic acid, an illustrative polylactate, an be prepared via known methods or obtained commercially. Polylactic acid is oxidized according to General Procedure A.

Scheme 3

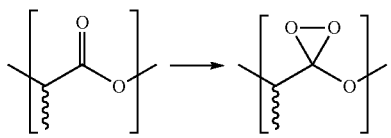

Example 4

Preparation of a polycarbonate including a pendant dioxirane moiety. Poly(bisphenol A carbonate), an illustrative polycarbonate, can be prepared via known methods or obtained commercially. Poly(bisphenol A carbonate) is oxidized according to General Procedure A. Such a process is illustrated in Scheme 4 where both carbonyl groups are converted to dioxirantes, however it is to be understood that only one of the groups may be converted, and not every monomer unit in the polymer is necessarily converted.

Scheme 4

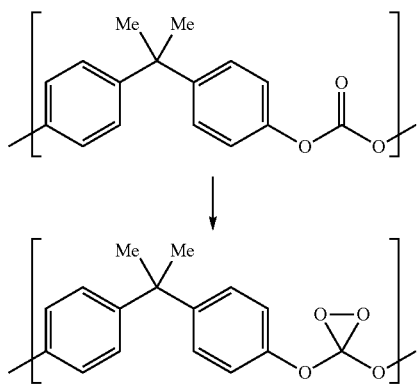

Example 5

Preparation of a polysaccharide including a pendant dioxirane moiety. Chitin, an illustrative polysaccharide, is available via known methods or obtained commercially. Chitin is oxidized according to General Procedure A. Such a process is illustrated in Scheme 5 where both carbonyl groups are converted to dioxirantes, however it is to be understood that only one of the groups may be converted, and not every monomer unit in the polymer is necessarily converted.

Scheme 5

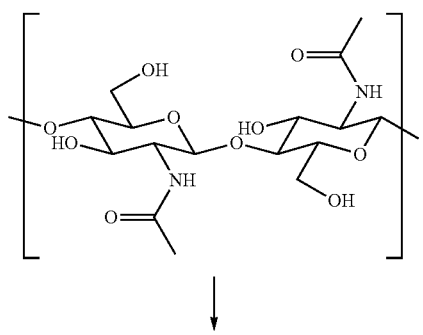

Example 6

Preparation of a polyacetate including a pendant dioxirane moiety, according to Scheme 6. Polyvinylacetate is available via known methods or obtained commercially. Polyvinylacetate is oxidized according to General Procedure A.

Scheme 6

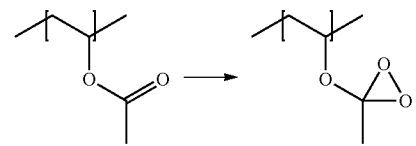

Example 7

Preparation of a polystyrene maleic anhydride including a pendant dioxirane moiety. Polystyrene maleic anhydride is readily available via known methods or obtained commercially. Polystyrene maleic anhydride is oxidized according to General Procedure A. Such a process is illustrated in Scheme 7 where both carbonyl groups are converted to dioxirantes, however it is to be understood that only one of the groups may be converted, and not every monomer unit in the polymer is necessarily converted.

Scheme 7

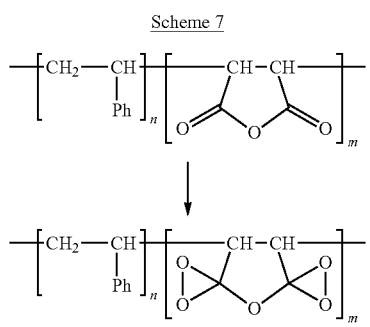

Example 8

Preparation of a polyurethane including a pendant dioxirane moiety. Poly(4,4'-diphenylmethane diisocyanate 1,2-ethanediol), an illustrative polyurethane, and related fibers are prepared by known methods, such as methods described in Heiss, H. L. et al. *Ind. Eng. Chem.* 46, 1498-1503 (1954) and U.S. Pat. Nos. 5,000,899 and 6,533,975 and references therein. The poly(4,4'-diphenylmethane diisocyanate 1,2-ethanediol) is oxidized according to General Procedure A. Such a process is illustrated in Scheme 8 where both carbonyl groups are converted to dioxirantes, however it is to be understood that only one of the groups may be converted, and not every monomer unit in the polymer is necessarily converted.

Scheme 8

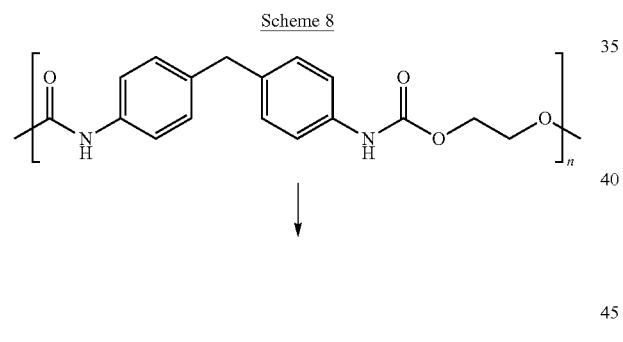

Example 9

Preparation of a modified polyamide including a pendant dioxirane moiety and a quaternary amine, according to Scheme 9. Poly(caprolactam) ("Nylon 6") is prepared via known methods or obtained commercially. Poly(caprolactam) is exhaustively methylated by adapting published methods [*Org. Synth.* Coll. Vol. 5, 315 (1973) and references therein], to form an illustrative polyamide.

Scheme 9

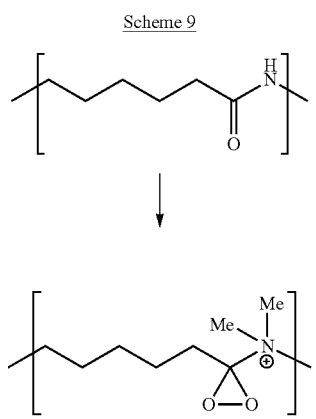

Example 10

Preparation of a modified polyacrylamide including a pendant dioxirane moiety, according to Scheme 10. Polyacrylamide with a molecular weight range of 5,000,000-6,000,000 is available by known methods and commercial sources such as Sigma-Aldrich and Acros Organics. Polyacrylamide is exhaustively methylated by adapting published methods [*Org. Synth.* Coll. Vol. 5, 315 (1973) and references therein], to form an illustrative polyacrylamide. 100 g of the modified polyacrylamide is then added to a mixture of water (1 L), sodium bicarbonate (2 M), and $2KHSO_5.KHSO_4.K_2SO_4$ (2 M w/r $KHSO_5$)) and stirred via magnetic stirbar for mechanical 1 h. The polymer is then purified by dialysis against distilled water using a dialysis membrane (molecular weight cutoff=1000). Freeze drying provides the modified polyacrylamide including a pendant dioxirane moiety.

Scheme 10

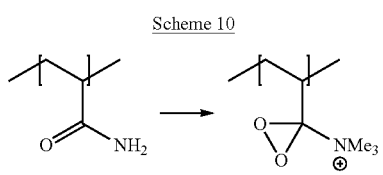

Example 11

Preparation of a modified polyacrylamide including a pendant dioxirane moiety, according to Scheme 11. Polydimethylacrylamide, an illustrative polyacrylamide, is prepared according to Isaure, F. et al. *React. Funct. Polym.* 66, 65-79 (2006). Polydimethylacrylamide is then exhaustively methylated by adapting published methods [*Org. Synth.* Coll. Vol. 5, 315 (1973) and references therein]. 100 g of the methylated polydimethylacrylamide is then added to a mixture of water (1 L), sodium bicarbonate (2 M), and $2KHSO_5.KHSO_4.K_2SO_4$ (2 M w/r $KHSO_5$)) and stirred via magnetic stirbar for mechanical 1 h. The polymer is then purified by dialysis against distilled water using a dialysis membrane (molecular weight cutoff=1000). Freeze drying provides the modified polyacrylamide including a pendant dioxirane moiety.

Scheme 11

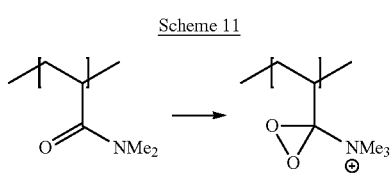

Example 12

Preparation of a poly(methyl)methacrylate including a pendant dioxirane moiety, according to Scheme 12. Poly (methyl)methacrylate, an illustrative methacrylate polymer, is available by known methods and commercial sources such as Sigma-Aldrich. Poly(methyl)methacrylate is oxidized according to General Procedure A.

Scheme 12

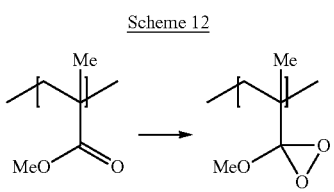

Example 13

Preparation of an aramid including a pendant dioxirane moiety. Poly-paraphenylene terephthalamide, an illustrative aramid, is available by known methods, such as the combination of para-phenylene diamine and terephthaloyl dichloride, and commercial sources such as DuPont (sold as KEVLAR). Poly-paraphenylene terephthalamide is oxidized according to General Procedure A. Such a process is illustrated in Scheme 13 where both carbonyl groups are converted to dioxirantes, however it is to be understood that only one of the groups may be converted, and not every monomer unit in the polymer is necessarily converted.

Scheme 13

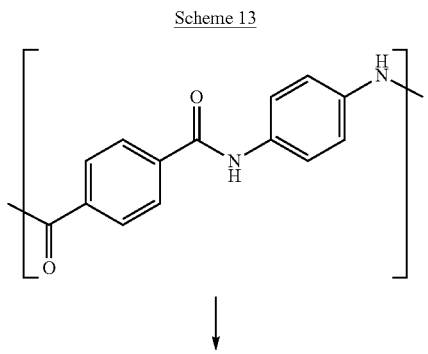

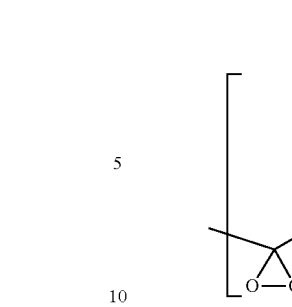

-continued

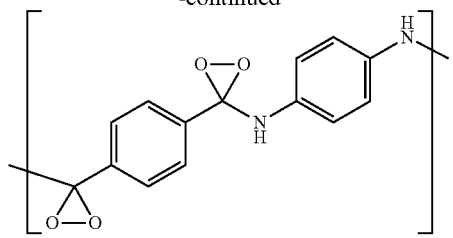

Example 14

Preparation of a polyurea including a pendant dioxirane moiety. Spandex is available by known methods and from commercial sources such as Invista. Spandex, an illustrative polyurea, is oxidized according to General Procedure A. Such a process is illustrated in Scheme 14 where both carbonyl groups are converted to dioxirantes, however it is to be understood that only one of the groups may be converted, and not every monomer unit in the polymer is necessarily converted.

Scheme 14

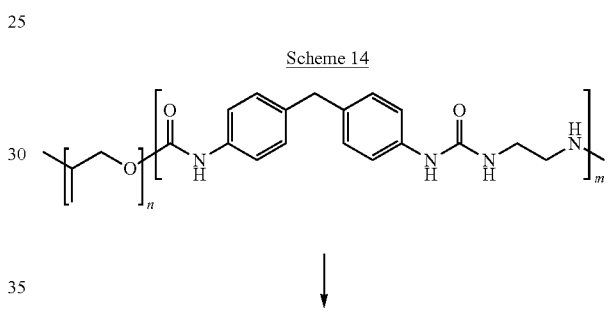

↓

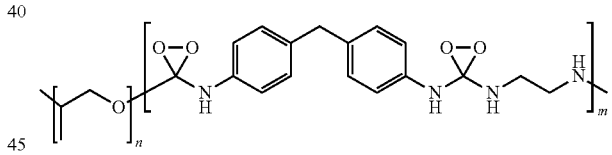

Example 15

Preparation of a modified polyurea including a pendant dioxirane moiety. Spandex is exhaustively methylated by adapting published methods [*Org. Synth*. Coll. Vol. 5, 315 (1973) and references therein], to form an illustrative modified polyurea. 100 g of the methylated spandex is then added to a mixture of water (1 L), sodium bicarbonate (2 M), and $2KHSO_5.KHSO_4.K_2SO_4$ (2 M w/r $KHSO_5$)) and stirred via magnetic stirbar for mechanical 1 h. The polymer is then purified by dialysis against distilled water using a dialysis membrane (molecular weight cutoff=1000). Freeze drying provides the modified spandex including a pendant dioxirane moiety. Such a process is illustrated in Scheme 15 where both carbonyl groups are converted to dioxirantes, however it is to be understood that only one of the groups may be converted, and not every monomer unit in the polymer is necessarily converted.

15

Scheme 15

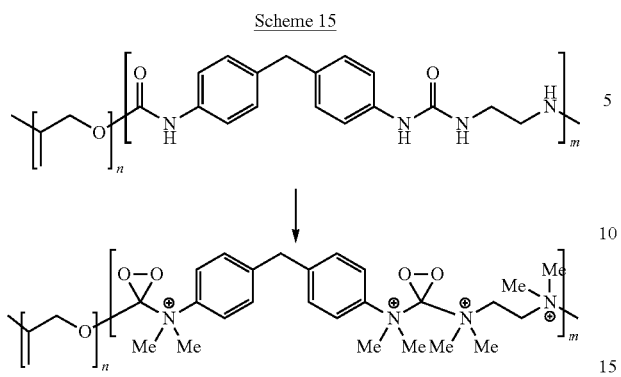

Example 16

Preparation of a polymer including a perfluoro stabilized pendant dioxirane moiety, according to Scheme 16. 1,1,1-trifluoro-3,3,4-trimethylpent-4-en-2-one, an illustrative polymer with a pendant perfluoro group, is prepared according to published methods [Nenajdenko, V. G. *Tetrahedron* 50, 11023-11038 (1994)]. 1,1,1-trifluoro-3,3,4-trimethylpent-4-en-2-one is polymerized by adapting published methods [Zhang, J. et al. *Macromolecules* 35, 8869-77 (2002); Monieau, C. et al. *Macromolecules* 32, 8277-82 (1999); Gilmer, T. C. et al. *J. Polym. Sci. Pol. Chem.* 34, 1025-37 (1996) and references therein]. Poly(1,1,1-trifluoro-3,3,4-trimethylpent-4-en-2-one) is oxidized according to General Procedure A.

Scheme 16

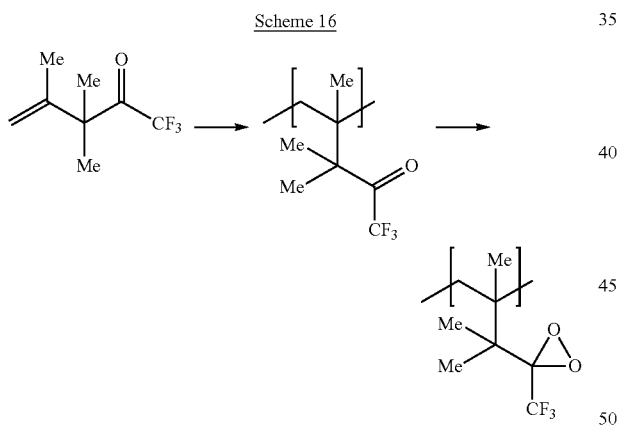

Example 17

Preparation of a branched backbone polymer including a perfluoro stabilized pendant dioxirane moiety, according to Scheme 17. 4-ethoxy-1,1,1-trifluorobut-3-en-2-one, an illustrative branched polymer, is available by known methods and commercially from Sigma-Aldrich. 4-ethoxy-1,1,1-trifluorobut-3-en-2-one is polymerized by adapting published methods [Zhang, J. et al. *Macromolecules* 35, 8869-77 (2002); Monieau, C. et al. *Macromolecules* 32, 8277-82 (1999); Gilmer, T. C. et al. *J. Polym. Sci. Pol. Chem.* 34, 1025-37 (1996) and references therein]. Poly(4-ethoxy-1,1,1-trifluorobut-3-en-2-one) is oxidized according to General Procedure A.

16

Scheme 17

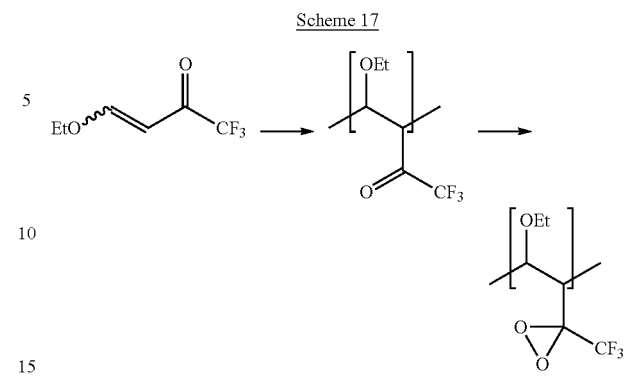

Example 18

Preparation of a poly(methyl-2-keto-3-butenoate) including a pendant dioxirane moiety, according to Scheme 18. Methyl-2-keto-3-butenoate is prepared from commercially available 2-keto-3-butenoic acid by adapting published methods [*Org. Synth.* Coll. Vol. 3, 610 (1995) and references therein]. Methyl-2-keto-3-butenoate is polymerized by adapting published methods [Zhang, J. et al. *Macromolecules* 35, 8869-77 (2002); Monieau, C. et al. *Macromolecules* 32, 8277-82 (1999); Gilmer, T. C. et al. *J. Polym. Sci. Pol. Chem.* 34, 1025-37 (1996) and references therein]. Poly(methyl-2-keto-3-butenoate) is oxidized according to General Procedure A.

Scheme 18

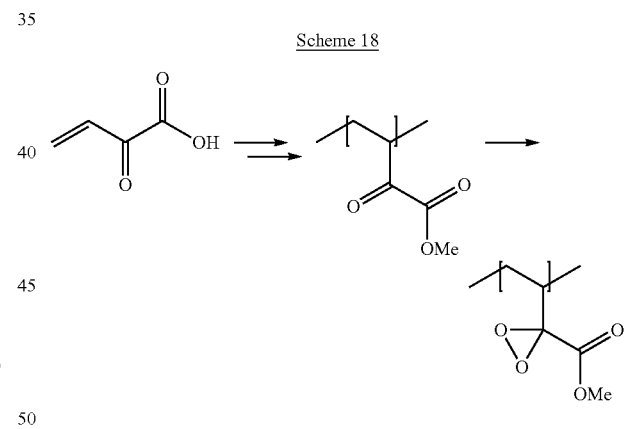

Example 19

Preparation of a poly(methyl-2-keto-4-pentenoate) including a pendant dioxirane moiety, according to Scheme 19. Methyl-2-keto-4-pentenoate is prepared from commercially available 2-keto-4-pentenoic acid by adapting published methods [*Org. Synth.* Coll. Vol. 3, 610 (1995) and references therein]. Methyl-2-keto-4-pentenoate is polymerized by adapting published methods [Zhang, J. et al. *Macromolecules* 35, 8869-77 (2002); Monieau, C. et al. *Macromolecules* 32, 8277-82 (1999); Gilmer, T. C. et al. *J. Polym. Sci. Pol. Chem.* 34, 1025-37 (1996) and references therein]. Poly(methyl-2-keto-4-pentenoate) is oxidized according to General Procedure A.

Scheme 19

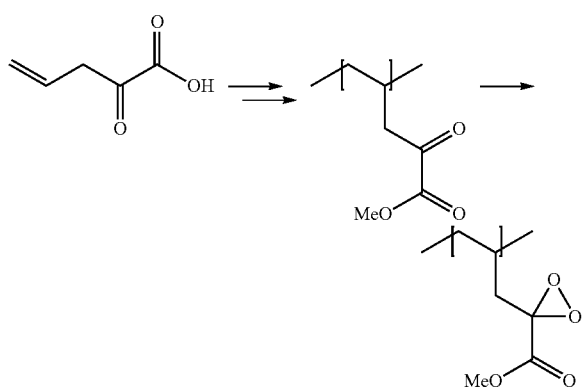

Example 20

Filtering a liquid with the polymer. A plug of disinfected glass wool is placed in the bottom of a glass column. The glass column is then filled with 100 g of the dioxirane bearing poly(methyl-2-keto-3-pentenoate) from Example 18. 300 mL of water bearing biological contaminants is then gently placed in the column. The water is then allowed to move through the polymer and into a receiving flask. Use of the polymer as a filter oxidizes the biological contaminants in the water. The filter may also trap the oxidized contaminants, or the oxidized biological contaminants remain with the water but their activity is substantially reduced or eliminated as a result of the oxidation.

Example 21

Regenerating a liquid filter. A solution of water (1 L), sodium bicarbonate (2 M), and $2KHSO_5 \cdot KHSO_4 \cdot K_2SO_4$ (2 M with respect to $KHSO_5$) is made (the "peroxymonosulfate solution"). The liquid filter of Example 20, after filtration, is loaded with a 300 mL of the peroxymonosulfate solution. The solution is then allowed to move through the polymer and into a receiving flask to regenerate the dioxirane moieties and help remove degraded contaminants. This may be repeated 2 more times with fresh peroxymonosulfate solution. The liquid filter may then be flushed with two 100 mL portions of distilled water to remove any remaining salts from the regeneration.

Example 22

Making an air filter. Polylactic acid including a pendant dioxirane moiety from Example 3 is pressed into porous sheets. The sheets are then pleated and connected to a steel screen by glue around the edges of the steel screen.

Example 23

Making an air filter using two polymers. Polylactic acid including a pendant dioxirane moiety from Example 3 and poly(methyl-2-keto-4-pentenoate) including a pendant dioxirane moiety from Example 19 are pressed together into porous sheets. The sheets are then pleated and connected to a steel screen by glue around the edges of the steel screen.

Example 24

Use of an air filter from Example 23. The air filter of Example 23 is placed in a home HVAC system in the filter holder. The HVAC system is turned on and allowed to work according to its design. Use of the filter in the HVAC system removes biological contaminants and chemical contaminants from the air in the home.

Example 25

Recycling of an air filter from Example 24. After the dioxirane moieties on the polymer filter have been substantially reduced, or after a pre-determined time period, the dioxirane moieties on the polymer filter may be regenerated. The filter may be sprayed or dipped in an aqueous peroxymonosulfate solution. The solution may include potassium peroxymonosulfate (OXONE®, DuPont, Wilmington Del.) at a concentration of 25 milliMolar; sodium bicarbonate (Sigma-Aldrich, St. Louis, Mo.) to adjust the pH to about 7; and cetyl trimethylammonium bromide (Sigma-Aldrich, St. Louis, Mo.) at a concentration of about 1 milliMolar. After spraying or dipping the filter, the carbonyl groups on the polymer are thus converted to the pendant dioxirane moieties to "recharge" or "recycle" the filter. After spraying or dipping the filter, the filter may be rinsed with distilled water.

Equivalents

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

Other embodiments are set forth in the following claims.

What is claimed is:

1. A polymer comprising at least one pendant dioxirane moiety represented by Formula I or II:

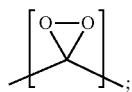

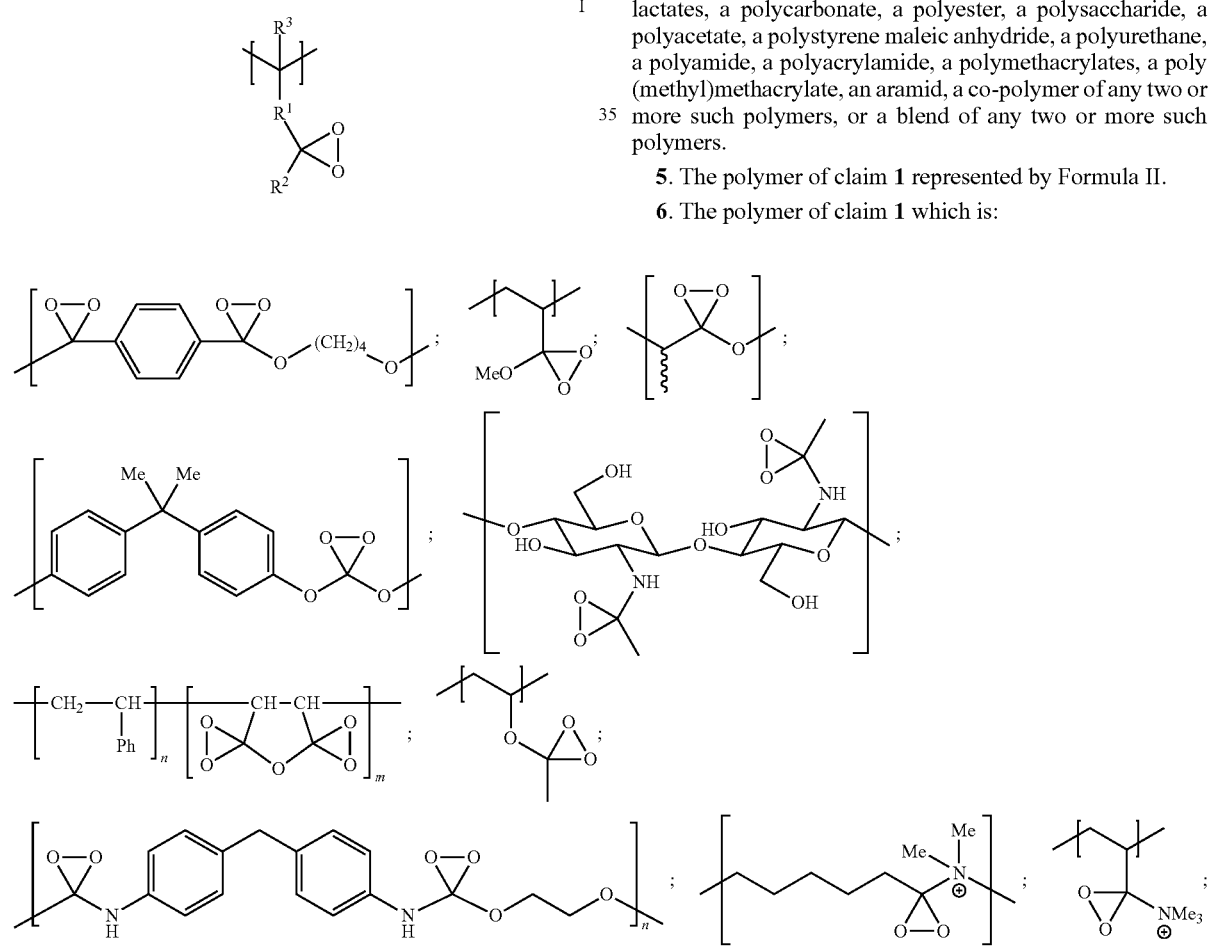

wherein:
the carbon atom of Formula II is in a polymer chain of the polymer;
$R^1$ is alkylene, perhaloalkylene, carbonyl, carboxyl, alkylcarboxyl, carboxyalkyl, or alkylcarboxyalkyl;
$R^2$ is an electron withdrawing group; and
$R^3$ is H, alkyl, perhaloalkyl, cycloalkyl, aryl, heteroaryl, heterocyclyl, amino, carbonyl, carboxyl, alkylcarboxy, carboxyalkyl or alkylcarboxyalkyl.

2. The polymer of claim 1, wherein the pendant dioxirane moiety is represented by Formula I, and wherein:
$R^2$ is —$N^+R^4R^5R^6$, halogen, $NO_2$, C(O)H, $CO_2R^7$, alkoxy, or perhaloalkyl;
$R^4$ is H, alkyl, or cycloalkyl;
$R^5$ is H, alkyl, or cycloalkyl;
$R^6$ is H, alkyl, or cycloalkyl; and
$R^7$ is H, alkyl, or cycloalkyl.

3. The polymer of claim 1, wherein $R^2$ is perfluoroalkyl.

4. The polymer of claim 1, wherein the polymer is a polyolefin, a polyalkylene terephthalate, a polyacrylate, a polylactates, a polycarbonate, a polyester, a polysaccharide, a polyacetate, a polystyrene maleic anhydride, a polyurethane, a polyamide, a polyacrylamide, a polymethacrylates, a poly(methyl)methacrylate, an aramid, a co-polymer of any two or more such polymers, or a blend of any two or more such polymers.

5. The polymer of claim 1 represented by Formula II.

6. The polymer of claim 1 which is:

-continued

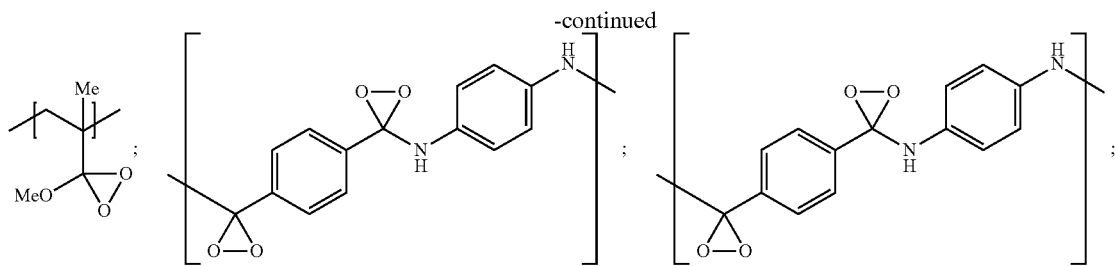

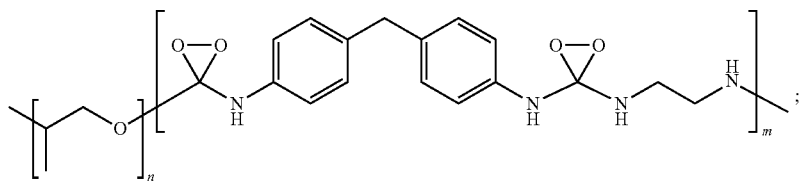

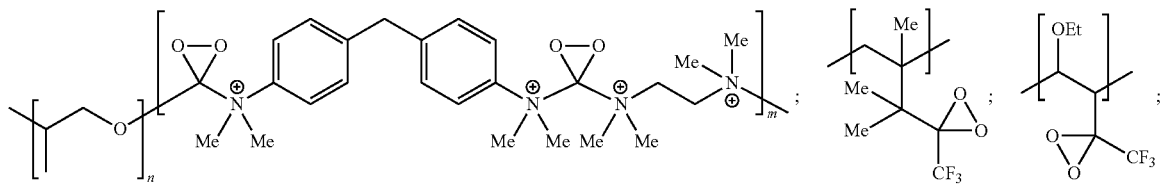

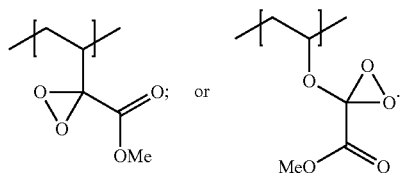

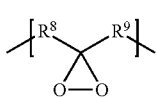 ; or 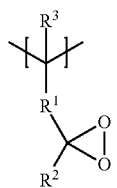.

7. A polymer comprising at least one pendant dioxirane moiety represented by Formula IV:

$$\text{IV}$$

wherein:
the carbon atom of Formula IV is in a polymer chain of the polymer;
$R^8$ is —$N^+R^4R^5$ or alkyl;
$R^9$ is —$N^+R^4R^5$ or alkyl;
each $R^4$ is independently H, alkyl, or cycloalkyl; and
each $R^5$ is independently H, alkyl, or cycloalkyl.

8. The polymer of claim 7, wherein the polymer is a polyolefin, a polyalkylene terephthalate, a polyacrylate, a polylactates, a polycarbonate, a polyester, a polysaccharide, a polyacetate, a polystyrene maleic anhydride, a polyurethane, a polyamide, a polyacrylamide, a polymethacrylates, a poly(methyl)methacrylate, an aramid, a co-polymer of any two or more such polymers, or a blend of any two or more such polymers.

9. A polymer comprising at least one pendant dioxirane moiety represented by Formula I:

$$\text{I}$$

wherein:
$R^1$ is alkylene, perhaloalkylene, carbonyl, carboxyl, alkylcarboxyl, carboxyalkyl, or alkylcarboxyalkyl;
$R^2$ is an electron withdrawing group; and
$R^3$ is H, alkyl, perhaloalkyl, cycloalkyl, aryl, heteroaryl, heterocyclyl, amino, carbonyl, carboxyl, alkylcarboxy, carboxyalkyl or alkylcarboxyalkyl.

10. The polymer of claim 9, wherein:
$R^2$ is —$N^+R^4R^5R^6$, halogen, $NO_2$, $C(O)H$, $CO_2R^7$, alkoxy or perhaloalkyl;
$R^4$ is H, alkyl, or cycloalkyl;
$R^5$ is H, alkyl, or cycloalkyl;

$R^6$ is H, alkyl, or cycloalkyl; and
$R^7$ is H, alkyl, or cycloalkyl.

11. The polymer of claim 9, wherein $R^2$ is perfluoroalkyl.

12. The polymer of claim 9, wherein the polymer is a polyolefin, a polyalkylene terephthalate, a polyacrylate, a polylactates, a polycarbonate, a polyester, a polysaccharide, a polyacetate, a polystyrene maleic anhydride, a polyurethane, a polyamide, a polyacrylamide, a polymethacrylates, a poly(methyl)methacrylate, an aramid, a co-polymer of any two or more such polymers, or a blend of any two or more such polymers.

13. The polymer of claim 9 which is:

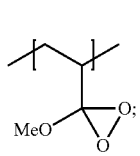
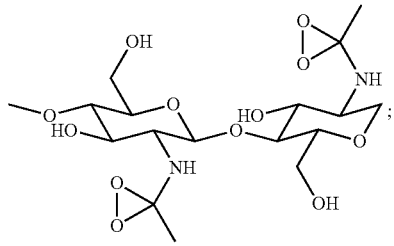
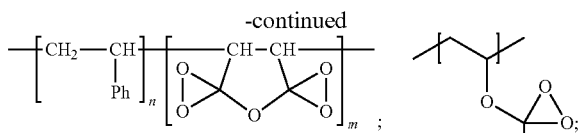
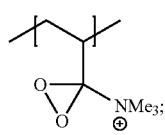
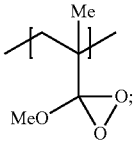
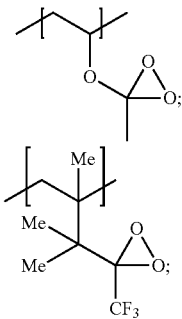
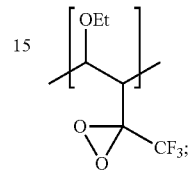
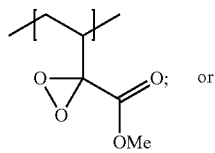
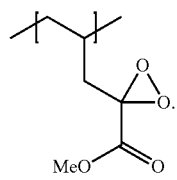
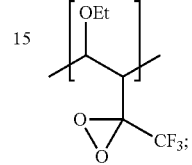

* * * * *

UNITED STATES PATENT AND TRADEMARK OFFICE
CERTIFICATE OF CORRECTION

PATENT NO. : 8,524,919 B2
APPLICATION NO. : 13/445567
DATED : September 3, 2013
INVENTOR(S) : Sjong et al.

It is certified that error appears in the above-identified patent and that said Letters Patent is hereby corrected as shown below:

On the title page, item (56), under "OTHER PUBLICATIONS", in Column 2, Line 49, delete "New York, New York, NY." and insert -- New York, NY. --, therefor.

In the Specifications

In Column 4, Line 21, delete "itself" and insert -- itself. --, therefor.

In Column 6, Lines 18-19, delete "an carbonyl" and insert -- a carbonyl --, therefor.

In Column 6, Line 36, delete "peoroxymonosulfates," and insert -- peroxymonosulfates, --, therefor.

In Column 9, Line 18, delete "an be" and insert -- can be --, therefor.

In Column 12, Line 33, delete "$KHSO_5$))" and insert -- $KHSO_5$) --, therefor.

In Column 12, Line 62, delete "$KHSO_5$))" and insert -- $KHSO_5$) --, therefor.

In Column 14, Line 58, delete "$KHSO_5$))" and insert -- $KHSO_5$) --, therefor.

In the Claims

In Column 23, Lines 15-22, in Claim 13, delete " 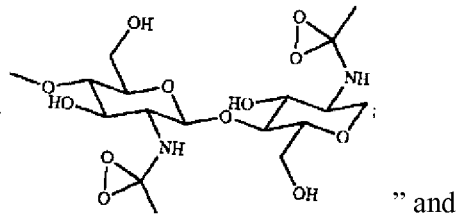 " and

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,524,919 B2 insert -- 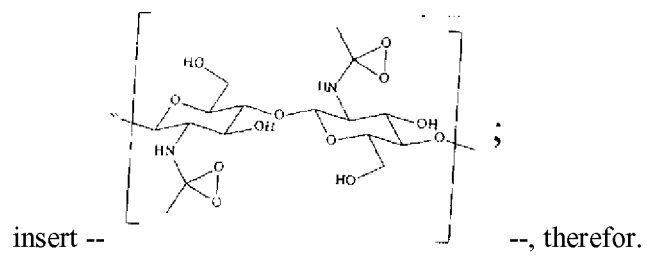 --, therefor.